United States Patent
Lee

(10) Patent No.: US 9,649,563 B2
(45) Date of Patent: May 16, 2017

(54) METHOD AND APPARATUS FOR CONTROLLING CHARACTER BY INPUTTING PATTERN

(71) Applicant: INTELLECTUAL DISCOVERY CO., LTD., Seoul (KR)

(72) Inventor: Wan Soo Lee, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 275 days.

(21) Appl. No.: 14/385,590

(22) PCT Filed: Dec. 21, 2012

(86) PCT No.: PCT/KR2012/011237
§ 371 (c)(1),
(2) Date: Sep. 16, 2014

(87) PCT Pub. No.: WO2013/183836
PCT Pub. Date: Dec. 12, 2013

(65) Prior Publication Data
US 2015/0072784 A1   Mar. 12, 2015

(30) Foreign Application Priority Data
Jun. 8, 2012  (KR) .................. 10-2012-0061439

(51) Int. Cl.
*A63F 13/55*  (2014.01)
*G06Q 50/10*  (2012.01)
(Continued)

(52) U.S. Cl.
CPC .......... *A63F 13/55* (2014.09); *A63F 13/2145* (2014.09); *A63F 13/426* (2014.09);
(Continued)

(58) Field of Classification Search
CPC ................. A63F 13/10; A63F 13/55
See application file for complete search history.

(56) References Cited

U.S. PATENT DOCUMENTS 7,309,287 B2    12/2007  Miyamoto et al.
2007/0262964 A1*  11/2007  Zotov ................... G06F 3/0416
                                                345/173
(Continued)

FOREIGN PATENT DOCUMENTS

JP      11-300038 A    11/1999
JP      2007-7080 A    1/2007
(Continued)

OTHER PUBLICATIONS

Extended European Search Report issued in European Patent Application No. 12878454.3-19958/2860687 issued on Jan. 7, 2016.
(Continued)

*Primary Examiner* — Steve Rowland

(57) ABSTRACT

There is provided a new character manipulating technique which can realize various actions and increase game usages of users. An exemplary embodiment of the present invention provides a character manipulating method using a pattern input, including: by a character manipulating device using a pattern input, receiving a first touch input for any one of at least one action menu that is displayed on a touch screen mounted in a user terminal to serve as a menu for inputting at least one action that is performable by a character in a game from a touch input sensor of the touch screen; when receiving a second touch input serving as a new touch input for the touch screen from the touch input sensor, receiving a pattern input that is moved while the second touch input is maintained therefrom; selecting pattern information corresponding to the received pattern input from among at least one item of predetermined pattern information stored at a storage space of the game by analyzing the pattern input;
(Continued)

selecting an action command matched with the selected pattern information from among at least one action command matched with each of the at least one item of predetermined pattern information stored at the storage space of the game; and transferring a control signal that is used for controlling the character to perform the selected action command to a processor for executing the game.

15 Claims, 16 Drawing Sheets

(51) Int. Cl.
  *A63F 13/2145* (2014.01)
  *G06F 3/0482* (2013.01)
  *G06F 3/0484* (2013.01)
  *G06F 3/0488* (2013.01)
  *A63F 13/426* (2014.01)
  *A63F 13/812* (2014.01)

(52) U.S. Cl.
  CPC .......... *G06F 3/0482* (2013.01); *G06F 3/0488* (2013.01); *G06F 3/04842* (2013.01); *G06F 3/04883* (2013.01); *G06F 3/04886* (2013.01); *G06Q 50/10* (2013.01); *A63F 13/812* (2014.09)

(56) References Cited

U.S. PATENT DOCUMENTS

| | | | |
|---|---|---|---|
| 2010/0005428 A1* | 1/2010 | Ikeda | G06F 3/04883 715/863 |
| 2010/0020025 A1* | 1/2010 | Lemort | G06F 3/04883 345/173 |
| 2010/0156818 A1* | 6/2010 | Burrough | G06F 3/016 345/173 |
| 2011/0057907 A1 | 3/2011 | Kim et al. | |
| 2013/0079140 A1* | 3/2013 | Watkins, Jr. | A63F 13/2145 463/37 |
| 2013/0207920 A1* | 8/2013 | McCann | G06F 3/0488 345/173 |
| 2013/0296057 A1* | 11/2013 | Gagner | G06F 3/017 463/37 |

FOREIGN PATENT DOCUMENTS

| | | |
|---|---|---|
| KR | 10-2010-0098972 A | 9/2010 |
| WO | 2010011006 A1 | 1/2010 |

OTHER PUBLICATIONS

International Search Report issued in PCT Appln. No. PCT/KR2012/011237 on Feb. 27, 2013 along with English translation, 4 pages.

\* cited by examiner

FIG. 15
| FIRST TOUCH | PATTERN INFORMATION | ACTION COMMAND |
|---|---|---|
| 1 |  | A1 |
| |  | A2 |
| |  | A3 |
| 2 |  | B1 |
| |  | B2 |
| |  | B3 |
300

FIG. 16
| PATTERN INFORMATION | FIRST TOUCH | ACTION COMMAND |
|---|---|---|
|  | 1 | A1 |
| | 2 | A2 |
| | 3 | A3 |
| 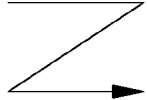 | 1 | B1 |
| | 2 | B2 |
| | 3 | B3 |
| 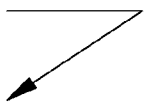 | 1 | C1 |
| | 2 | C2 |
| | 3 | C3 |
310

METHOD AND APPARATUS FOR CONTROLLING CHARACTER BY INPUTTING PATTERN

CROSS REFERENCE TO RELATED APPLICATIONS

This application is a 35 U.S.C. §371 National Phase Entry Application from PCT/KR2012/011237, filed on Dec. 21, 2012, and designating the United States, which claims priority under 35 U.S.C. §119 to Korean Patent Application No. 10-2012-0061439 filed on Jun. 8, 2012, which are incorporated herein in their entireties.

TECHNICAL FIELD

The present invention relates to a technique for manipulating at least one character on a game, and more particularly, to a technique for accomplishing various game effects by manipulating at least one character with a predetermined input means through a pattern input that is formed while a touch input of a touch screen is maintained, to offer new fun to manipulate the character for users.

BACKGROUND ART

With recent development of techniques for game contents, the game industry has been established as one of the culture contents. Particularly, the game market of mobile terminals is growing as time goes on. Further, as the hardware performance of mobile terminals such as smart phones is improved, the quality of games that are available in the mobile terminals is being improved day by day.

As the game quality level of the mobile terminals is increased, a technique for controlling various game effects when a game is performed in a mobile terminal has already sufficiently been acquired. However, users feel many difficulties in manipulating the mobile terminals to control various game effects.

Each of the mobile terminals has not only predetermined kinds of input signals but also a small size in terms of its characteristics, so it is not easy for the users to provide inputs for game manipulations. As a result, the game quality of the mobile terminals is improved, while the kinds of the games that can be played in the mobile terminals are limited.

Particularly, for real-time games that require real-time manipulation such as sports games, role-playing games, and the like, it is difficult to perform quick manipulation through the mobile terminals. So, the users have mainly enjoyed turn-based games, strategy games, and the like through the mobile terminals.

With the high usage of the mobile terminals, it has been increasingly required to develop the technique for diversifying the kinds of the games that can be performed in the mobile terminals by facilitating difficult manipulation even in the mobile terminals to offer fun for the users.

DISCLOSURE

Technical Problem

The present invention has been made in an effort to provide a new character manipulating technique using a touch screen as a representative input means of a mobile terminal, having advantages of being capable of controlling various game effects, and thus enabling users to feel new fun in enjoying games to increase game usages.

Technical Solution

An exemplary embodiment of the present invention provides a character manipulating method using a pattern input, including: by a character manipulating device using a pattern input, receiving a first touch input for any one of at least one action menu that is displayed on a touch screen mounted in a user terminal to serve as a menu for inputting at least one action that is performable by a character in a game from a touch input sensor of the touch screen; when receiving a second touch input serving as a new touch input for the touch screen from the touch input sensor, receiving a pattern input that is moved while the second touch input is maintained therefrom; selecting pattern information corresponding to the received pattern input from among at least one item of predetermined pattern information stored at a storage space of the game by analyzing the pattern input; selecting an action command matched with the selected pattern information from among at least one action command matched with each of the at least one item of predetermined pattern information stored at the storage space of the game; and transferring a control signal that is used for controlling the character to perform the selected action command to a processor for executing the game.

The selecting of the pattern information may include extracting action type information corresponding to the received first touch input; extracting items of pattern information corresponding to the extracted action type information from among said at least one item of predetermined pattern information; and selecting pattern information corresponding to the pattern input from among the extracted items of pattern information.

The pattern information matched with each of the action commands may have different pattern shapes.

The selecting of the pattern information may include extracting action type information corresponding to the received first touch input; extracting action commands pertaining to the extracted action type information from among said at least one action command; and selecting an action command that is matched with the selected pattern information from among the extracted action commands.

The pattern information that is matched with the action commands pertaining to the extracted action type information may have different pattern shapes.

The receiving of the pattern input may include receiving a pattern input that is moved while the second touch input is maintained for a time during the first touch input is maintained.

The receiving of the pattern input may include receiving a pattern input that is moved while the second touch input is maintained for a predetermined input time regardless of whether the first touch input is maintained.

The receiving of the pattern input may include exclusively receiving a pattern that is moved while the second touch input is maintained within a predetermined pattern input area of a touch input area of the touch screen as the pattern input.

The character manipulating method may further include reducing a performing speed of the game at a predetermined ratio after the receiving the first touch input.

The reducing of the performing speed of the game at the predetermined ratio may be performed for a predetermined time regardless of whether the first touch input is maintained.

The reducing of the performing speed of the game at the predetermined ratio is performed for a predetermined time regardless of whether the first touch input is maintained.

The receiving of the pattern may input include receiving a pattern that is moved while the second touch input is maintained for a time during which the performing speed of the game is reduced as the pattern input.

The character manipulating method may further include, after the receiving of the first touch input, extracting action type information corresponding to the first touch input; extracting at least one action command pertaining to the extracted action type information; and controlling pattern information that is matched with the extracted action command to be outputted to the touch screen.

The character manipulating method may further include, when the second touch input is not received after the receiving of the first touch input, transferring a control signal that is used for controlling the character to perform an action command corresponding to the first touch input to the processor.

Another exemplary embodiment of the present invention provides a character manipulating method using a pattern input, including: a touch input analyzer configured to receive receiving a first touch input for any one of at least one action menu that is displayed on a touch screen mounted in a user terminal to serve as a menu for inputting at least one action that is performable by a character in a game from a touch input sensor of the touch screen and, when receiving a second touch input serving as a new touch input for the touch screen from the touch input sensor, a pattern input that is moved while the second touch input is maintained therefrom; a pattern information selector configured to select pattern information corresponding to the received pattern input from among at least one item of predetermined pattern information stored at a storage space of the game by analyzing the pattern input; an action command selector configured to select an action command matched with the selected pattern information from among at least one action command matched with each of said at least one item of predetermined pattern information stored at the storage space of the game; and a character controller configured to transfer a control signal that is used for controlling the character to perform the selected action command to a processor for executing the game.

Items of predetermined basic pattern information may be matched with the respective action menus, and the storing may be performed by newly matching the received pattern with pattern information of the action menus.

Yet another exemplary embodiment of the present invention provides a computer readable recording medium recorded with a program for executing a character manipulating method using a pattern input, wherein the character manipulating method includes, by a character manipulating device using a pattern input, receiving a first touch input for any one of at least one action menu that is displayed on a touch screen mounted in a user terminal to serve as a menu for inputting at least one action that is performable by a character in a game from a touch input sensor of the touch screen, when receiving a second touch input serving as a new touch input for the touch screen from the touch input sensor, receiving a pattern input that is moved while the second touch input is maintained therefrom; selecting pattern information corresponding to the received pattern input from among at least one item of predetermined pattern information stored at a storage space of the game by analyzing the pattern input; selecting an action command matched with the selected pattern information from among at least one action command matched with each of said at least one item of predetermined pattern information stored at the storage space of the game; and transferring a control signal that is used for controlling the character to perform the selected action command to a processor for executing the game.

Advantageous Effects

According to the embodiments of the present invention, it is possible to control a character by using a pattern input. Accordingly, when the character is manipulated through inputs of various items of pattern information, kinds of actions that can be performed by the character can be increased in response to kinds of patterns, thereby diversifying character manipulating commands. As a result, it is possible to diversify game effects that can be controlled by the character.

Further, users can control the character by using pattern inputs through touches, and thus can have a new feeling of manipulation to be offered with fun. As a result, game usages of the users can be improved.

DESCRIPTION OF THE DRAWINGS

FIG. 11 to FIG. 16 illustrate examples of a screen displayed on a user terminal according to each exemplary embodiment of the present invention.

MODE FOR INVENTION

Figure 1:
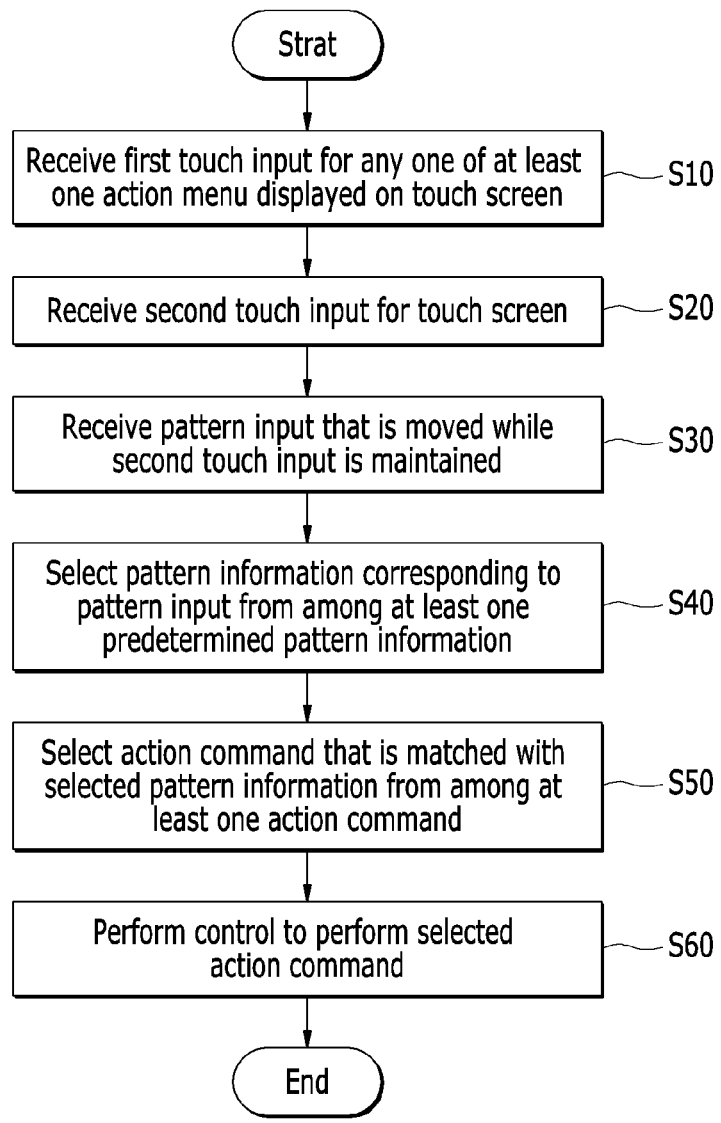
FIG. 1 is a flowchart illustrating a character manipulating method using a pattern input according to an exemplary embodiment of the present invention.

Hereinafter, a character manipulating method and a character manipulating device using pattern input will be described with reference to the accompanying drawings.

In the following description, in order to clearly understand the present invention, description of a known technology regarding a characteristic of the present invention will be omitted. It is obvious that the following exemplary embodiment is a detailed description which is provided for more understanding of the present invention but does not limit the scope of the present invention. Therefore, an equivalent invention which performs the same function as the present invention may be also covered by the scope of the present invention.

In the following description, like reference numerals designate like elements having the same configuration and redundant description and description of a known technology will be omitted.

In an exemplary embodiment of the present invention, "communication", "communication network" and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer to which users access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middle ware for database or servers which perform payment processing may be connected to the game server, but the description thereof will be omitted in the present invention.

In this specification, game contents indicate programs that is downloaded from a game server and stored in a memory of a user terminal by a user such that the user can enjoy corresponding games by executing the stored programs in the user terminal. Further, the game contents may include online contents that can be played by a corresponding game server that a user accesses, which stores and removes data in real time. The game contents may be executed in at least one mode of a "single-play" mode in which a user can play a match against a computer artificial intelligence through a user terminal, and a "multi-play" mode in which a user can enjoy a game with other users through network connection therewith.

In this specification, game characters indicate all characters appearing in an online game that can be manipulated by a user. The game characters appear on a game screen and show predetermined actions that can be taken in the game according to the manipulation of a user. Further, the game character increases a level by accumulating a predetermined experience point according to a result of playing the game and when the level is increased, the capability of the character becomes stronger.

The capability point of the character indicates information having a predetermined number which is included in the information of the character. The character information includes a plurality of numbers which represents a capability point of the character and each number is used as an indicator representing the characteristic and a strength/weakness of the character in the game.

For example, in a sports game, positions of the characters vary according to the capability point of the character. For example, in the case of a soccer game, positions are set such that a character having a high capability point in attacking is a striker, a character having a high capability point in passing and dribbling is a midfielder, a character having a high capability point in defense is a defender, and a character having a high capability in goal keeping is a goal keeper. In other words, it means that characters have different capability points in accordance with the positions. Further, it is obvious that a better player may have a higher absolute value of a capability point than that of other players.

In this specification, the capability of a character may include capability related movement such as a movement speed, an instantaneous speed increasing rate, and a balance for the change of moving direction. Further, the capability of the character may include the force of a kick, the accuracy of a kick, and the like in the case of offense and a tackle, a defensive skill, and the like in the case of defense. Any capability value of generally expressing the capability of a character in the soccer game may be employed as the capability of a capability in this specification.

The actions that can be taken by a character in each game may depend on races, occupations and types of the character and play conditions. For example, in the case of the soccer game, the actions that can be taken by a character may be varied according to whether the current play is an offensive play or a defensive play.

In the case of the role-playing game, the skills of a character that can be embodied by occupations of the character may be varied, and there may be special actions that can be exclusively taken according to the races of a character.

Such action commands that can be performed by a character may be stored in a storage space of the game, a user may select the action commands through input of the touch screen, and the selected action commands may be immediately transmitted to a processor to control the character to perform corresponding actions.

FIG. 1 is a flowchart illustrating a character manipulating method using a pattern input according to an exemplary embodiment of the present invention.

Referring to FIG. 1, in the character manipulating method using the pattern input according to the present exemplary embodiment, a character manipulating device (hereinafter, simply referred to as "device") performs a step S10 for receiving a first touch input for any one of at least one action menu displayed on a touch screen.

That is, the first touch input indicates, an input of selecting one of the action menus displayed on the touch screen. On the touch screen, the action menus may be displayed as menus that be inputted for a basic action for manipulating a character according to kinds of games. The user can control the character to perform the basic action through an input that is made by touching the menu displayed on the touch screen.

As a result, unless any input is additionally made for a stand-by time after the first touch input, the character will perform an action command corresponding to the first touch input. The stand-by time for the additional input may be predetermined per game.

For example, in the case of the role-playing game, a menu for inputting a command of directing to perform an offensive action may be displayed on the touch screen. In the case that a touch input for an offensive action menu is sensed, the device determines whether an input for a pattern to be described below is sensed for a predetermined time and transmits a corresponding control command to the processor to control the character to perform a predetermined basic offensive action when the pattern input is not sensed. Further, in the case of a touch input for a moving action menu, the same process as described above is performed.

For example, for the soccer game, menus corresponding to actions such as shot and pass may be displayed, and a control command for performing a shot or pass action that basically predetermined according to games is generated and transmitted to the processor unless the pattern input is sensed.

After the first touch input is received by performing the step S10, the device performs a step S20 for receiving a second touch input as a new touch input for the touch screen, from a touch input sensor.

In the step S20, a newly inputted touch input may be received while the first touch input, or a touch input of which the pattern input is started after the first touch input is released may be received.

Once the step S20 is performed, the device performs a step S30 for receiving a pattern input that is formed by being moved in a state in which the second touch input is maintained.

The pattern input indicates a continuous line-like input that is formed by being moved while the user's touch is maintained without being released after the second touch input is received. The touch input sensor can sense a continuous line-like input by repeatedly receiving continuous start and release of a touch input that is received, while the touch input is maintained, and can receive the continuous line-like input as the pattern input.

Once the step S30 is performed, the device performs a step S40 for analyzing a vector variation of the pattern input to select one item of pattern information that is most similar to the analyzed vector variation of the pattern input from among at least one predetermined item of pattern information stored in the storage space of the game. As a result, pattern information corresponding to the pattern input is selected.

In this case, a method of selecting pattern information having vector varying pattern information that is most similar to a vector varying pattern of a pattern input may be used as the rule for selecting pattern information corresponding to the pattern input, but any method for comparing the pattern input with the previous pattern format may be used.

Once the pattern information is selected through the step S40, the device performs a step S50 for selecting one action command matched with the selected pattern information from among at least one action matched with each item of pattern information.

According to the exemplary embodiment of the present invention, in the storage space of the game, pattern information for realizing each action command may be stored in a matching able form by being matched with corresponding action commands. As a result, when specific pattern information is selected, an action command that is matched with the selected pattern information may be automatically selected.

Once the action command is selected by performing the step S50, the device performs a step S60 for transmitting a signal for controlling the character to perform the selected action command, to the processor of the user terminal.

As such, as a specific action menu is touched, information is inputted, and an additional action corresponding to the information, a basic action and an additional action can be conveniently embodied and various action commands can be embodied according to inputs of the touch screen.

Figure 2:
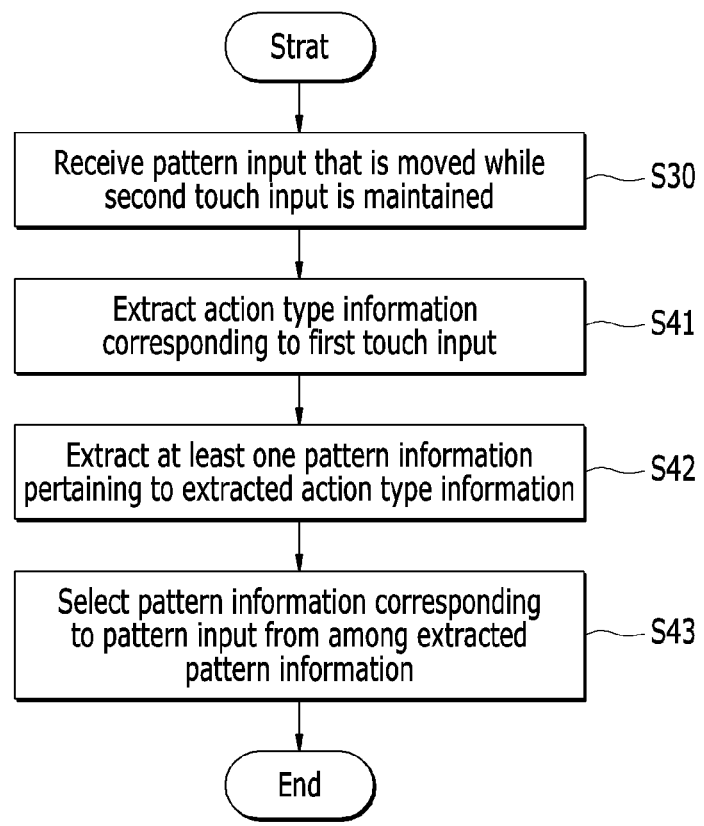
FIG. 2 illustrates an example of a flow for selecting pattern information according to an exemplary embodiment of the present invention.

FIG. 2 illustrates an example of a flow for selecting pattern information according to an exemplary embodiment of the present invention.

Referring to FIG. 2, when the step S30 for receiving the pattern input is performed, a server performs a step S41 for extracting action type information corresponding to the first touch input from among a plurality of items of action type information by using the first touch input received in the step S10.

In the present invention, the action type information indicates information related to actions that can be performed by the character, which are classified according to types. For example, the actions that can be performed by the character may be classified according to basic action types.

In the case of the soccer game, the basic action types may include offensive play, shot, pass, movement, dribble, and the like. In the case of the role-playing game, all actions may be classified according to basic action types such as offensive, sorcery, movement and the like to be stored.

Once the step S41 is performed, the device performs a step S42 for extracting pattern information pertaining to the extracted action type information from among a plurality of items of pattern information.

Since action commands may be classified according to types thereof, the pattern information may be also stored according to the action type information. Accordingly, the device can extract pattern information corresponding to the action type information from among the pattern information.

Next, the device performs a step S43 for selecting pattern information corresponding to a pattern input from among the extracted pattern information. Next, an action command is selected according to the selected pattern information to control the character.

As such, a selecting speed at which the action command is selected by using the pattern input can be significantly increased by extraction some pattern information through the first touch input instead of all pattern information and comparing the extracted pattern information with the touch input.

In the meantime, the pattern information matched with each action command is required to have different pattern shapes per action command, to perform the exemplary embodiment of FIG. 2. This is because the pattern information is exclusively used to select the action commands, and thus two or more action commands cannot have the same pattern information.

Figure 3:
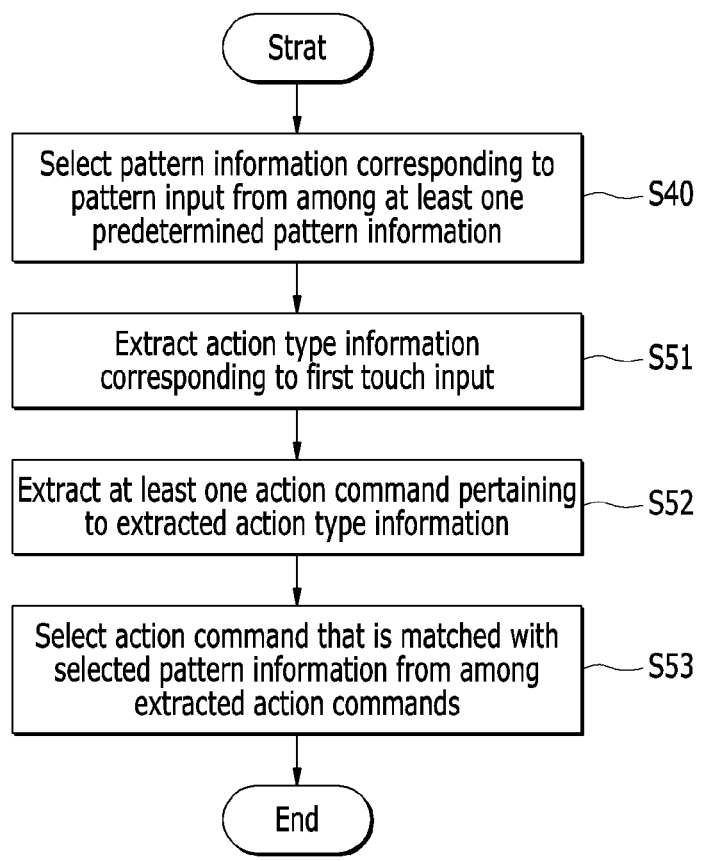
FIG. 3 illustrates an example of a flow for selecting an action command according to an exemplary embodiment of the present invention.

FIG. 3 illustrates an example of a flow for selecting an action command according to an exemplary embodiment of the present invention.

Referring to FIG. 3, once the step S40 for selecting the pattern information is performed, the device performs a step S51 for extracting action type information corresponding to the first touch input received by performing the step S10 illustrated in FIG. 1.

Once the step S51 is performed, the device performs a step S52 for extracting action commands corresponding to the extracted action type information from among the action commands.

Similar to FIG. 2, in the exemplary embodiment of FIG. 3, the action commands may be classified according to the action type information. As a result, the device firstly extracts the action command according to the action type information before selecting the action command matched with the pattern information through the step S52.

As such, in the exemplary embodiment of FIG. 3, there may be as many action commands having the same pattern information as the number of the action type information. For example, action commands for shot, pass, and dribble may be matched with one item of pattern information.

Next, the device performs a step S53 for selecting the action command that is matched with the selected pattern information from among the extracted action commands, and then transfers an action command signal for controlling the character to the processor.

FIG. 4 to FIG. 7 illustrate examples of flows for receiving a pattern input according to an exemplary embodiment of the present invention.

Figure 4:
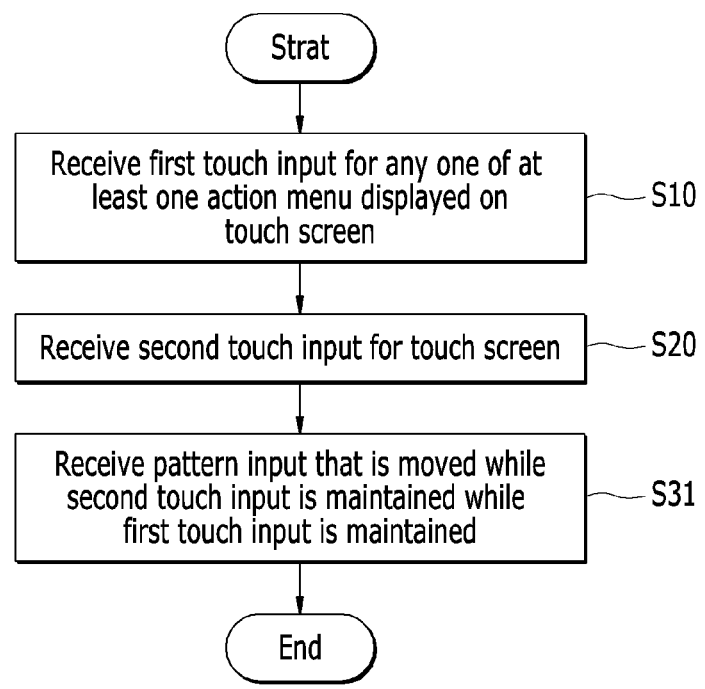
FIG. 4 to FIG. 7 illustrate examples of flows for receiving a pattern input according to an exemplary embodiment of the present invention.

First, referring to FIG. 4, the device performs the step S10 for receiving the first touch input and the step S20 for sensing the start of the second touch input.

Next, the device may perform a step S31 for exclusively receiving a pattern input that is moved while the second touch input is maintained for a time at which the first touch input is maintained, as the pattern input in the present invention. As a result, in the exemplary embodiment of FIG. 4, the user is required to perform the pattern input while maintaining the first touch input corresponding to the basic action to take an additional action.

Figure 5:
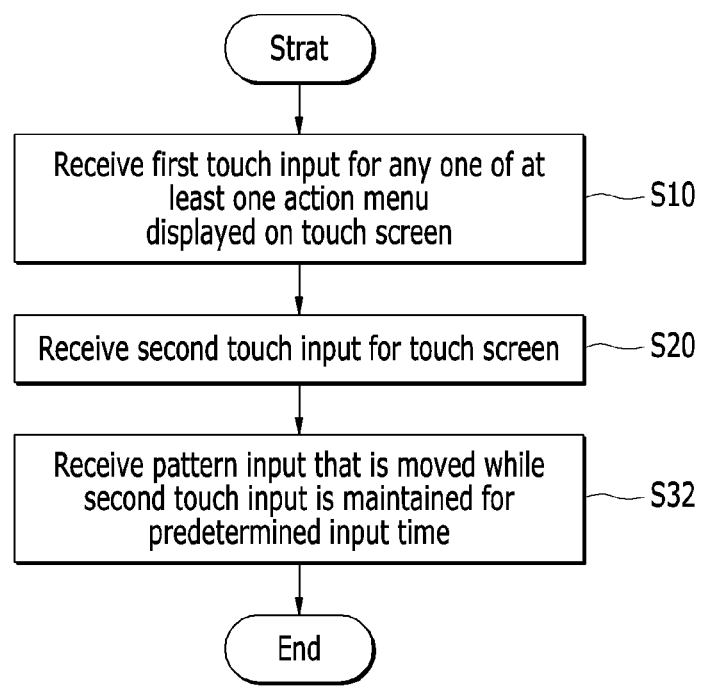

Referring to FIG. 5, after performing the steps S10 and S20 illustrated in FIG. 1, the device performs a step S32 for exclusively receiving a pattern input that is moved while maintaining the second touch input for a predetermined input time regardless of the first touch input that is maintained, as the pattern input in the present invention.

As a result, in the exemplary embodiment of FIG. 5 that is different from that of FIG. 4, a predetermined input time is started immediately when the user performs the first touch input, and the pattern input is received regardless of whether the touch input is maintained.

The exemplary embodiments of FIG. 4 and FIG. 5 may be selectively set according to types of interfaces for inputting the action commands, which are displayed on the game or the touch screen.

Figure 6:
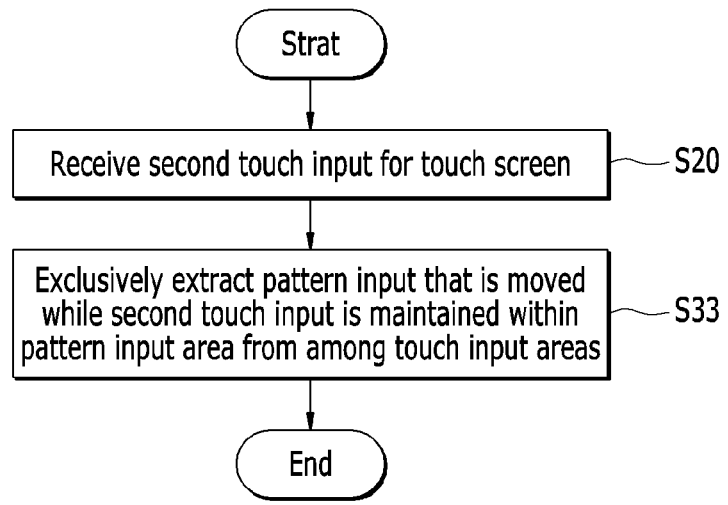

Referring to FIG. 6, once receiving the start of the second touch input (step S20), the device may perform a step S33 for exclusively receiving a pattern input that is moved while the second touch input is maintained within a pattern input area that is set as a predetermined area among areas of the touch screen that can receive touch inputs.

As a result, in the exemplary embodiment of FIG. 6, there may be an area desired for performing the pattern input, and the device may receive the pattern input through at a limited area. Alternatively, a method for receiving the pattern input at the area through which the touch input can be performed on the touch screen may be used regardless of the exemplary embodiment of FIG. 6.

Figure 7:
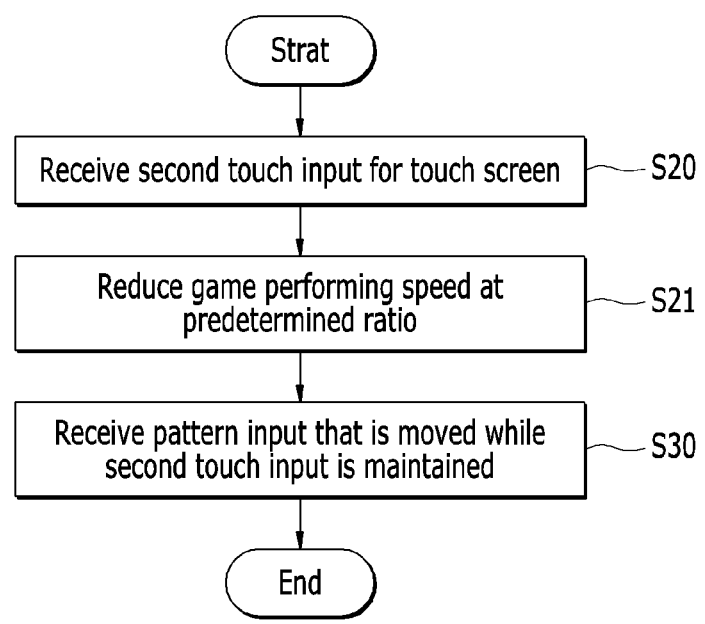

Referring to FIG. 7, the device performs a step S21 for reducing a game performing speed at a predetermined ratio immediately when performing the step S20 for receiving the second touch input.

In the present invention, the pattern input may be performed in a simple way or in a relatively complicated way. However, in the case that the pattern input is performed in a complicated way, the user may get into difficulties.

As a result, in the exemplary embodiment of FIG. 7, while the step S30 for receiving the pattern input, the step S21 is performed to reduce the game performing speed. Accordingly, users can easily input patterns.

In this case, when the game performing speed is reduced by performing the step S21, the game may be executed in slow motion or may be temporarily stopped.

In this case, the period during which the game performing speed is reduced may be the period during which the first touch input is maintained. This may correspond to the exemplary embodiment of FIG. 4. Further, the game performing speed may be reduced for a predetermined time regardless of whether the first touch input is maintained. This may correspond to the exemplary embodiment of FIG. 5.

As a result, the period during which the game performing speed is reduced may be set as a period during which the pattern input is received.

Figure 8:
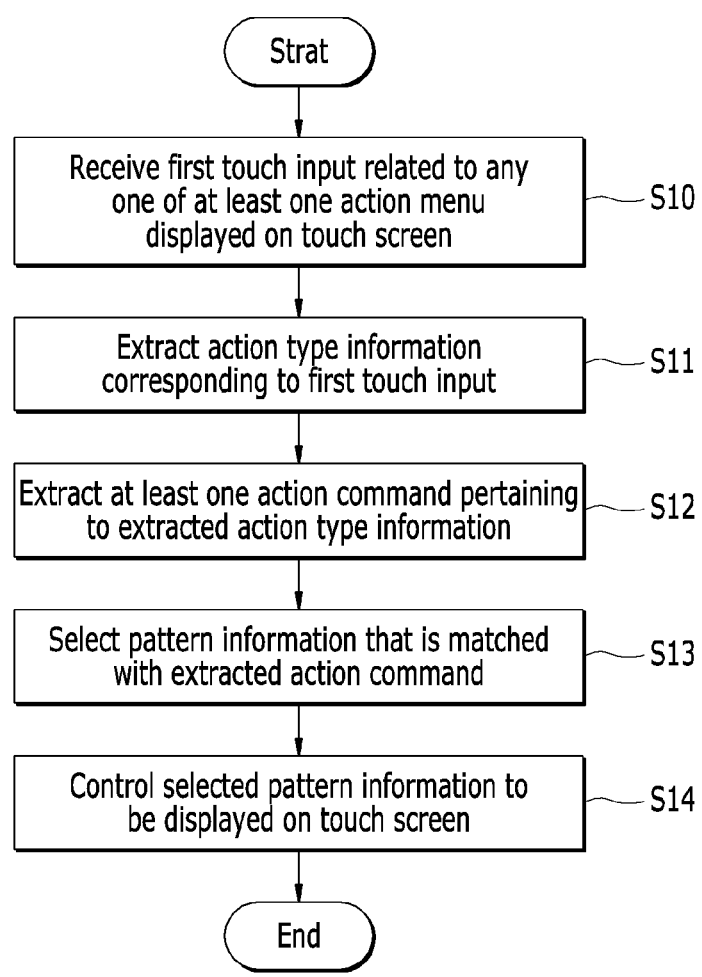
FIG. 8 illustrates an example of a flow for providing pattern information according to an exemplary embodiment of the present invention.

FIG. 8 illustrates an example of a flow for providing pattern information according to an exemplary embodiment of the present invention.

Once receiving the first touch input (step S10), the device performs a step S11 for extracting action type information corresponding to the first touch input. Next, the device performs a step S12 for extracting action commands corresponding to the extracted action type information from among the action commands.

Once extracting the action commands as a result of the step S12, the device performs a step S13 for selecting pattern information that is matched with each of the extracted action commands, and then performs a step S14 for controlling the selected pattern information to be outputted on the touch screen.

As a result, in the exemplary embodiment of FIG. 8, a user may perform the first touch input, and then may allow examples of pattern inputs that can be performed according to the first touch input to be outputted. Accordingly, any user who is difficult to remember the pattern inputs can easily perform the pattern inputs to realize desired actions.

Figure 9:
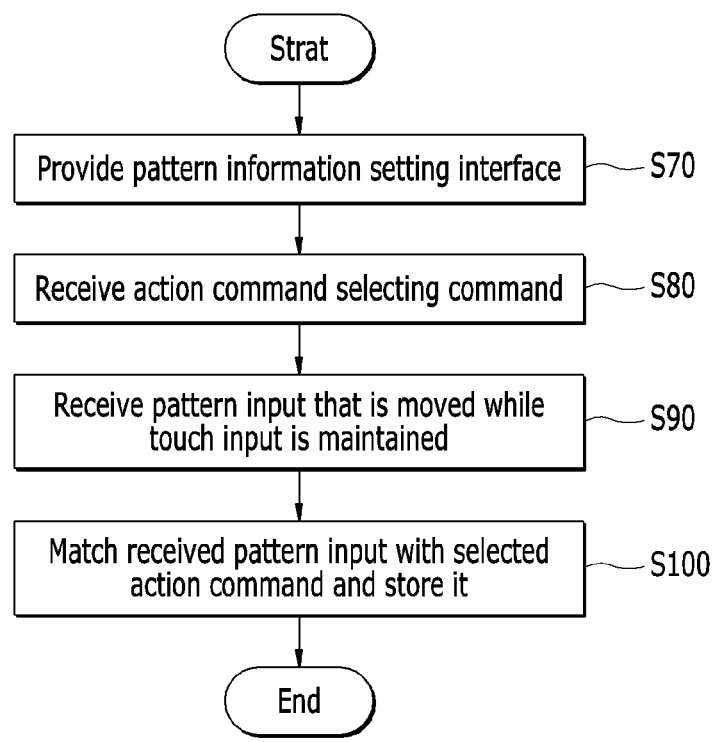
FIG. 9 is a flowchart illustrating a character manipulating method using a pattern input according to an exemplary embodiment of the present invention.

FIG. 9 is a flowchart illustrating a character manipulating method using a pattern input according to an exemplary embodiment of the present invention.

Referring to FIG. 9, the device performs a step S70 for displaying a pattern information setting interface including various menus that are used to set pattern input information for manipulating a character on the touch screen.

On the pattern information setting interface, a menu for searching and selecting each action command, a menu for inputting a pattern, a menu for checking an inputted pattern, a menu for matching an action command with a pattern, a menu for storing predetermined pattern information, and the like may be displayed.

Next, the device performs a step S80 for receiving a touch input for any one of a plurality of action commands through the touch screen by using the interface.

Once a touch input an action command is received, the menu for inputting a pattern. The device performs a step S90 for receiving an input for a pattern that is moved while the touch input is maintained through the menu.

Next, the device performs a step S100 for matching the received pattern with pattern information of the selected action menu to store it.

In this case, basic pattern information is matched with action commands for which a user does not input pattern information through the information setting interface according to game setting. In other words, a user may use basically set pattern information, or pattern information that is inputted by the user through the pattern information setting interface.

Once receiving a pattern, the device replaces basic pattern information with the inputted pattern information to store it.

Figure 10:
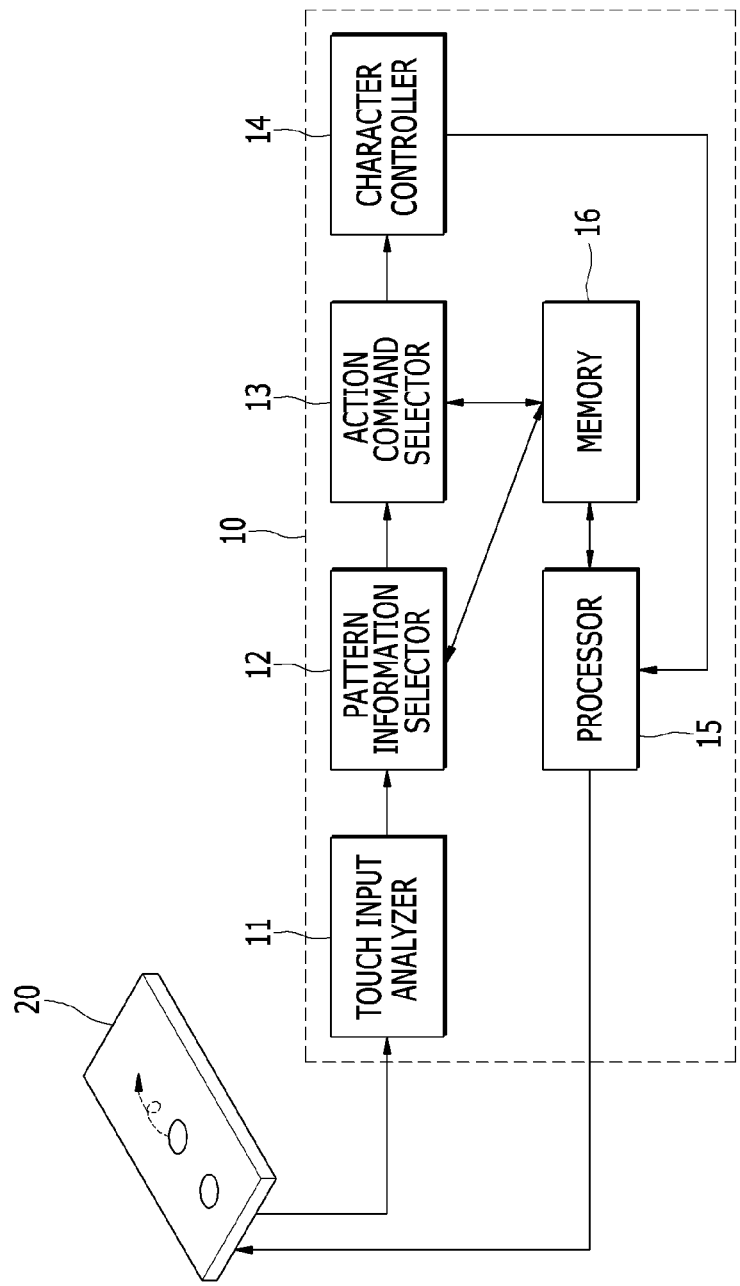
FIG. 10 is a schematic diagram of a character manipulating device using a pattern input according to an exemplary embodiment of the present invention.

FIG. 10 is a schematic diagram of a character manipulating device using a pattern input according to an exemplary embodiment of the present invention. In the following description, descriptions related to functions of parts overlapped with the descriptions of FIG. 1 to FIG. 9 among functions of the respective parts will be omitted.

Referring to FIG. 10, the character manipulating device 10 using the pattern input according to an exemplary embodiment of the present invention includes a touch input analyzer 11, a pattern information selector 12, an action command selector 13, and a character controller 14. Further, the character manipulating device 10 may include a memory 16 for storing a program and data that are used to execute a game, and a processor 15 for executing the game.

The touch input analyzer 11 serves to receive the first touch input for any one of the action menus by user's touch from a touch input sensor (not shown) of the touch screen 20, to receive the second touch input as a new touch input from the touch input sensor, and to receive a pattern input that is moved while the second touch input is maintained.

In this case, the pattern input may be received for a time during which the first touch input is maintained, or for a predetermined time. Further, as described with reference to FIG. 6, the pattern input that is performed within the pattern input area may be exclusively received as the pattern input of the present invention. In addition, as described with reference to FIG. 7, the game performing speed can be reduced at a predetermined ratio while the pattern input is performed.

When the second touch input is not received, the first touch input may be exclusively received and transferred to the pattern information selector 12.

The pattern information selector 12 serves to analyze the pattern input in order to select pattern information corresponding to the pattern input from among at least one item of pattern information.

The pattern information selector 12 transfers a result of analyzing the pattern input to the memory 16, and the memory 16 transfers pattern information corresponding to the analyzing result to the pattern information selector 12 in response thereto.

In this case, as described with reference to FIG. 2, pattern information may be extracted according to action type information corresponding to the first touch input, and then pattern information corresponding to the pattern input may be selected.

The action command selector 13 serves to select an action command that is matched with the pattern information. In this case, as described with reference to FIG. 3, action commands may be firstly extracted according to the action type information, and then an action command that is matched with the pattern information may be selected from the memory 16

The character controller 14 serves to control a character by transferring an action command selected by the action command selector 13 to the processor 15.

The processor 15 may perform the functions illustrated in FIG. 8 and FIG. 9. Specifically, once receiving the first touch input, the processor 15 may control pattern information that is matched with an action command pertaining to the action type information corresponding to the first touch input to be outputted to the touch screen 20.

Further, the processor 15 may display a pattern information setting interface on the touch screen and match pattern information with the respective action commands according to touch inputs to store them in the memory 16.

FIG. 11 to FIG. 16 illustrate examples of a screen displayed on a user terminal according to each exemplary embodiment of the present invention. In the following description, descriptions related to functions of parts overlapped with the descriptions of FIG. 1 to FIG. 10 among functions of the respective parts will be omitted.

Figure 11:
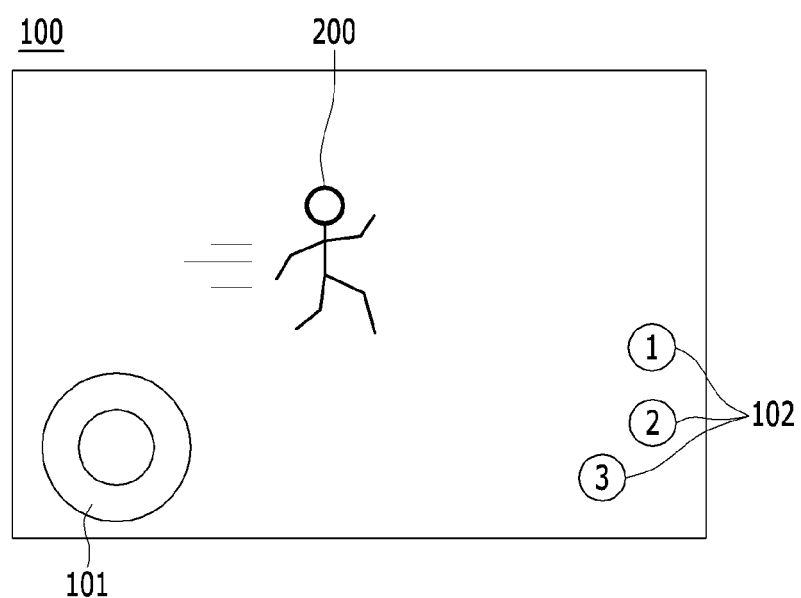

Referring to FIG. 11, a basic game screen 100 is displayed. The game screen 100 is displayed on the touch screen, and a character 200, an direction action input menu 101, and an action input menu 102 may be displayed on the game screen. A user can perform the aforementioned first touch input by using the touch input for the menus 101 and 102.

Figure 12:
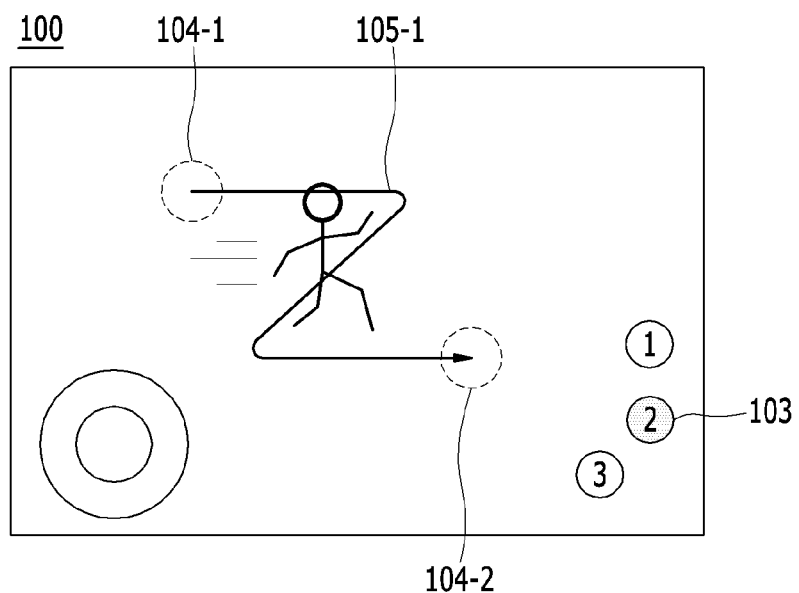

Referring to FIG. 12, the user selects any one of the action input menus on the game screen 100 to perform a first touch input 103, and thus a start 104-1 of a second touch input is performed, and then a predetermined pattern input 105-1 is performed. Then, a release 104-2 of the second touch input is performed. In this way, a pattern input 105-1 may be completed.

As a result, an action command corresponding to the pattern input 105-1 may be performed.

Figure 13:
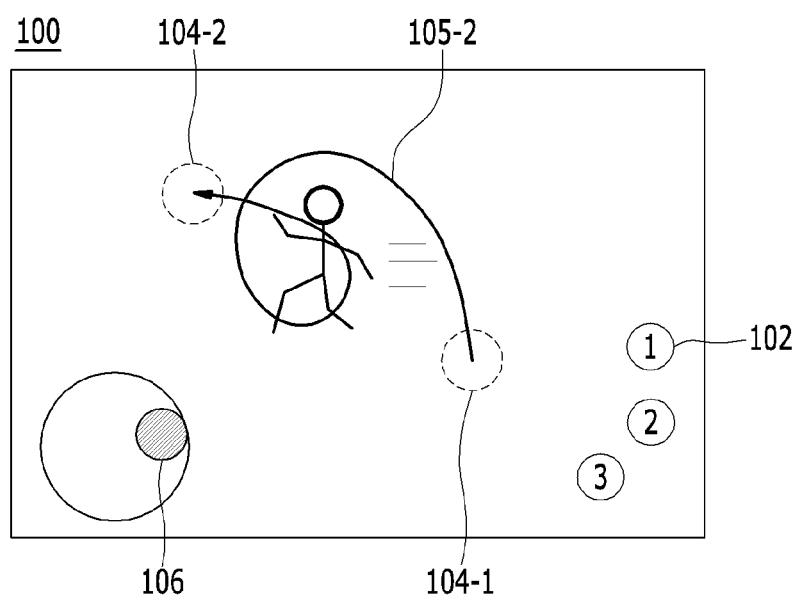

In FIG. 13, a first touch input 106 for the direction action input menu 101 is performed on the game screen 100, but no first touch input for the action input menu 102 is performed.

Accordingly, the start 104-1 of a second touch input is performed, and then a predetermined pattern input 105-2 is performed. Then, the release 104-2 of the second touch input is performed. Accordingly, the pattern input 105-2 may be performed, and resultantly an action command corresponding to the pattern input 105-2 for a direction input menu.

Figure 14:
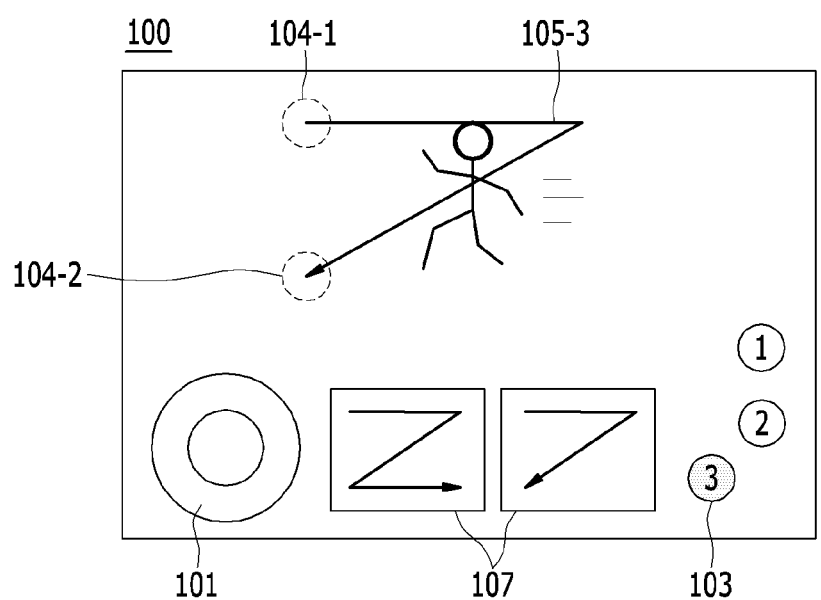

In FIG. 14, when the first touch input 103 for an action command is received, two items of pattern information 107 pertaining to the action type information corresponding to the first touch input 103 are displayed by the device.

The user can control the pattern information 107 to be displayed through the direction action input menu 101.

Next, the user can perform the start 104-1 and the release 104-2 of the second touch input for inputting any one item of the pattern information 107. In this way, the pattern that is formed by the movement of the touch input may serve as the pattern input 105-3.

FIG. 15 and FIG. 16 respectively illustrate matching tables 300 and 310 of each action command and pattern information.

Referring to the matching table 300 of FIG. 15, items of pattern information that are classified according to the action type information corresponding to the first touch input are stored. In this case, the items of pattern information have different shapes from each other. Further, each of the items of pattern information is matched with a corresponding action command.

Referring to the matching table 310 of FIG. 16, first touch inputs are classified according to the action type information for one item of pattern information, and thus are respectively matched with different action commands.

That is, the exemplary embodiment of FIG. 16 corresponds to the exemplary embodiment of FIG. 3, and the same pattern information may be matched with a different action command according to the first touch inputs.

The above-described character manipulating method using the pattern input according to the exemplary embodiments of the present invention may be executed by an application (which may include a program which is included in a platform or an operating system which is basically mounted in a terminal) which is basically installed in a terminal, or executed by an application (that is, a program) which is directly installed in the terminal by a user through an application provider server such as an application store server or a web server related to an application or the service. In this way, the above-described character manipulating method using the pattern input according to the exemplary embodiments of the present invention may be implemented by an application (that is, a program) which is basically installed in the terminal or directly installed by a user or recorded in computer readable recording media such as a terminal.

Such a program is recorded in computer readable recording media and executed by a computer to perform the above-described functions.

As described above, in order to execute the above-described character manipulating method using the pattern input according to the exemplary embodiments of the present invention, the above-mentioned program may include a code which is coded by a computer language such as C, C++, JAVA, or a machine language which may be read by a processor (CPU) of the computer.

Such a code may include a function code related with a function which defines the above-mentioned functions and a control code which is related with an executing procedure which is required for the processor of the computer to execute the above-mentioned functions in accordance with a predetermined procedure.

Further, the code may include additional information required to execute the above-mentioned functions by the processor of the computer or a memory reference related code indicating a location (an address number) of an internal or external memory of the computer where the media is referenced.

In addition, when communication with another remote computer or server is required to execute the above-mentioned functions by the computer processor, the code may further include a communication related code indicating how to communicate with another remote computer or server by the computer processor using a communication module (for example, wired and/or wireless communication module) of the computer or which information or media is transmitted or received at the time of communication.

Further, a functional program, a code, or code segment related thereto which implements the present invention may be easily inferred or modified by programmers skilled in the art to which the present invention pertains in consideration of a system environment of the computer which reads the recording media and executes the program.

Computer readable media in which the above-described program is recorded may include, for example, a ROM, a RAM, a CD-ROM, a magnetic tape, a floppy disk, and an optical media storage device.

Further, the computer readable recording media in which the program as described above is recorded is distributed to computer systems which are connected by a network so that a computer readable code may be stored and executed in a distributed manner. In this case, one or more computers among a plurality of distributed computers execute some of the above-suggested functions and transmit the execution result to one or more of other distributed computers, and a computer which receives the result executes some of the above-suggested functions and provides the result to other distributed computers.

Particularly, a computer readable recording medium in which an application, that is, a program for executing the character manipulating method using the pattern input according to the exemplary embodiments of the present invention is recorded may be a storage medium (for example, a hard disk) which is included in an application provider server such as an application store server or a web server related with an application or the service or the application provider server itself.

A computer which may read a recording medium in which an application which is a program for executing the character manipulating method using the pattern input according to the exemplary embodiments of the present invention is recorded may include not only a general PC such as a general desktop computer or a notebook computer but also a mobile terminal such as a smart phone, a tablet PC, a personal digital assistant (PDA), and a mobile communication terminal, and may be interpreted as all computable equipment.

Further, when the computer which may read a recording medium in which an application which is a program for executing the character manipulating method using the pattern input according to the exemplary embodiments of the present invention is recorded is a mobile terminal such as a smart phone, a tablet PC, a PDA, or a mobile communication terminal, the application is downloaded from the application provider server to the general PC and installed in the mobile terminal through a synchronizing program.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components but further include the components. In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been just exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

The invention claimed is:

1. A character manipulating method using a pattern input, the method comprising:

receiving, by a character manipulating device, a first touch input selecting one of at least one action menu that is displayed on a touch screen mounted in a user terminal, wherein each of the at least one action menu corresponds to a respective action that is performable by a character in a game from a touch input sensor of the touch screen;

when receiving a second touch input serving as a new touch input for the touch screen from the touch input sensor after the first touch input is received, receiving, by the character manipulating device, a pattern input that is moved while the second touch input is maintained therefrom;

selecting, by the character manipulating device, pattern information corresponding to the received pattern input from among at least one item of predetermined pattern information stored at a storage space of the game by analyzing the pattern input;

selecting, by the character manipulating device, an action command matched with the selected pattern information from among at least one action command matched with each of said at least one item of predetermined pattern information stored at the storage space of the game; and transferring, by the character manipulating device, a control signal that is used for controlling the character to perform the selected action command to a processor for executing the game.

2. The character manipulating method of claim 1, wherein the selecting of the pattern information includes:
extracting action type information corresponding to the received first touch input;
extracting items of pattern information corresponding to the extracted action type information from among said at least one item of predetermined pattern information; and
selecting pattern information corresponding to the pattern input from among the extracted items of pattern information.

3. The character manipulating method of claim 1, wherein the selecting of the pattern information includes:
extracting action type information corresponding to the received first touch input;
extracting action commands pertaining to the extracted action type information from among said at least one action command; and
selecting an action command that is matched with the selected pattern information from among the extracted action commands.

4. The character manipulating method of claim 1, wherein the receiving of the pattern input includes receiving a pattern input that is moved while the second touch input is maintained for a time during the first touch input is maintained.

5. The character manipulating method of claim 1, wherein the receiving of the pattern input includes receiving a pattern input that is moved while the second touch input is maintained for a predetermined input time regardless of whether the first touch input is maintained.

6. The character manipulating method of claim 1, wherein the receiving of the pattern input includes exclusively receiving a pattern that is moved while the second touch input is maintained within a predetermined pattern input area of a touch input area of the touch screen as the pattern input.

7. The character manipulating method of claim 1, further comprising reducing a performing speed of the game at a predetermined ratio after the receiving the first touch input.

8. The character manipulating method of claim 7, wherein the reducing of the performing speed of the game at the predetermined ratio is performed while the first touch input is maintained.

9. The character manipulating method of claim 7, wherein the reducing of the performing speed of the game at the predetermined ratio is performed for a predetermined time regardless of whether the first touch input is maintained.

10. The character manipulating method of claim 7, wherein the receiving of the pattern input includes receiving a pattern that is moved while the second touch input is maintained for a time during which the performing speed of the game is reduced as the pattern input.

11. The character manipulating method of claim 1, further comprising:
after the receiving of the first touch input,
extracting action type information corresponding to the first touch input; extracting at least one action command pertaining to the extracted action type information; and
controlling pattern information that is matched with the extracted action command to be outputted to the touch screen.

12. The character manipulating method of claim 1, further comprising:
when the second touch input is not received after the receiving of the first touch input,
transferring a control signal that is used for controlling the character to perform an action command corresponding to the first touch input to the processor.

13. The character manipulating method of claim 1, further comprising: displaying a pattern information setting interface for setting pattern input information for manipulating the character on the touch screen of the user terminal;
receiving a touch input for any one of at least one action menu included in the pattern information setting interface from the touch input sensor of the touch screen;
receiving an input of a pattern that is moved while a touch input is maintained from the touch input sensor of the touch screen; and
matching the received pattern with pattern information of an action menu corresponding to the received touch input to store it.

14. A character manipulating device using a pattern input, the device comprising:
a touch input analyzer configured to receive a first touch input selecting one of at least one action menu that is displayed on a touch screen mounted in a user terminal, wherein each of the at least one action menu corresponds to a respective action that is performable by a character in a game from a touch input sensor of the touch screen and, when receiving a second touch input serving as a new touch input for the touch screen from the touch input sensor after the first touch input is received, receive a pattern input that is moved while the second touch input is maintained therefrom;
a pattern information selector configured to select pattern information corresponding to the received pattern input from among at least one item of predetermined pattern information stored at a storage space of the game by analyzing the pattern input;
an action command selector configured to select an action command matched with the selected pattern information from among at least one action command matched with each of said at least one item of predetermined pattern information stored at the storage space of the game; and a character controller configured to transfer a control signal that is used for controlling the character to perform the selected action command to a processor for executing the game.

15. A non-transitory computer readable recording medium recorded with a program for executing a character manipulating method using a pattern input, wherein the character manipulating method includes:

receiving a first touch input selecting one of at least one action menu that is displayed on a touch screen mounted in a user terminal, wherein each of the at least one action menu corresponds to a respective action that is performable by a character in a game from a touch input sensor of the touch screen;

when receiving a second touch input serving as a new touch input for the touch screen from the touch input sensor after the first touch input is received, receiving a pattern input that is moved while the second touch input is maintained therefrom;

selecting pattern information corresponding to the received pattern input from among at least one item of predetermined pattern information stored at a storage space of the game by analyzing the pattern input;

selecting an action command matched with the selected pattern information from among at least one action command matched with each of said at least one item of predetermined pattern information stored at the storage space of the game; and transferring a control signal that is used for controlling the character to perform the selected action command to a processor for executing the game.

* * * * *